United States Patent [19]
Schittenhelm et al.

[11] Patent Number: 5,851,587
[45] Date of Patent: Dec. 22, 1998

[54] PROCESS FOR PRODUCING COATED BISMUTH VANADATE YELLOW PIGMENTS

[75] Inventors: Hans-Joachim Schittenhelm, Köln; Rudolf Hill, Langenfeld, both of Germany

[73] Assignee: Bayer AG, Leverkusen, Germany

[21] Appl. No.: 585,123

[22] Filed: Jan. 11, 1996

[30] Foreign Application Priority Data

Jan. 25, 1995 [DE] Germany .................. 195 02 196.7

[51] Int. Cl.$^6$ .................. B05D 7/00; C04B 14/00
[52] U.S. Cl. .................. 427/212; 427/214; 427/372.2; 106/479; 106/14.12
[58] Field of Search .................. 106/479, 14.12; 427/212, 214, 372.2

[56] References Cited

U.S. PATENT DOCUMENTS

| | | |
|---|---|---|
| 3,370,971 | 2/1968 | Linton . |
| 4,026,722 | 5/1977 | Hess . |
| 4,063,956 | 12/1977 | Higgins . |
| 4,115,141 | 9/1978 | Piltingsrud . |
| 4,115,142 | 9/1978 | Hess . |
| 4,230,500 | 10/1980 | Balducci et al. .................. 106/479 |
| 4,251,283 | 2/1981 | Balducci et al. .................. 106/462 |
| 4,455,174 | 6/1984 | Wienand et al. . |
| 4,851,049 | 7/1989 | Wienand et al. . |
| 5,123,965 | 6/1992 | Herren et al. .................. 106/462 |
| 5,203,917 | 4/1993 | Schwochow . |
| 5,273,577 | 12/1993 | Liedek et al. . |
| 5,399,197 | 3/1995 | Vermoortele et al. .................. 106/479 |
| 5,411,586 | 5/1995 | Schmid et al. .................. 106/479 |
| 5,536,309 | 7/1996 | Etzrodt et al. .................. 106/461 |

FOREIGN PATENT DOCUMENTS

| | | |
|---|---|---|
| 0 074 049 | 3/1983 | European Pat. Off. . |
| 0 239 526 | 9/1987 | European Pat. Off. . |
| 0 441 101 | 8/1991 | European Pat. Off. . |
| 32 21 338 | 12/1983 | Germany . |
| 33 15 850 | 10/1984 | Germany . |
| 39 26 870 | 2/1991 | Germany . |
| 41 19 668 | 12/1992 | Germany . |
| 05-271568 | 10/1993 | Japan . |

OTHER PUBLICATIONS

Orbit Abstract of JP A 01313585 (Dec. 19,1989).
Ullmans Encyclopedia of Industrial Chemistry, vol. A20, pp. 246–263.

*Primary Examiner*—Shrive Beck
*Assistant Examiner*—Bret Chen
*Attorney, Agent, or Firm*—Connolly & Hutz

[57] ABSTRACT

The present invention relates to a process for producing coated bismuth vanadate yellow pigments comprising the following steps:

(a) subjecting a reaction mixture comprising a suspension in nitric acid of bismuthyl nitrate and vanadium (V) oxide, or a suspension in nitric acid of bismuth (III) oxide and vanadium (V) oxide, to stirring to form bismuth vanadate particles;

(b) terminating the stirring and holding the reaction mixture for a period of time;

(c) filtering off the bismuth vanadate particles;

(d) washing the bismuth vanadate particles;

(e) dispersing the washed bismuth vanadate particles in a hot, phosphate-containing, aqueous solution to activate the surface of the particles;

(f) filtering off the activated bismuth vanadate particles;

(g) washing the activated bismuth vanadate particles;

(h) dispersing the activated bismuth vanadate particles in water to form a suspension;

(i) precipitating at least one material selected from the group consisting of hydrated aluminum phosphate, aluminum/zinc phosphate or silicon oxide onto the external surface of the activated bismuth vanadate particles in the suspension to form said coating;

(j) filtering off the coated bismuth particles;

(k) washing and drying the coated bismuth vanadate particles.

10 Claims, No Drawings

PROCESS FOR PRODUCING COATED BISMUTH VANADATE YELLOW PIGMENTS

The present invention relates to color stable, coated, bismuth yellow vanadate pigments made from a core of a yellow colouring bismuth vanadate, a process for preparing these pigments and their use.

Bismuth vanadate pigments are finding increasing application as substitutes for cadmium, lead and chromium(VI)-containing inorganic pigments, which are increasingly being criticised from an ecological and toxicological point of view (DE-A 2 727 863 DE-A 3 135 281). Yellow colouring bismuth vanadate pigments are provided for imparting colour to plastics and lacquers. Here, the coloration of products which are produced from molten polyolefin plastics in an injection moulding process has a special importance. In an injection moulding process, the processing temperature is between 280° and 320° C., for reasons of viscosity.

Bismuth vanadate pigments are known in a number of variants. In the literature, zirconium-containing (DE-A 4 040 849), phosphorus-containing (DE-A 4 200 925), molybdenum and tungsten-containing (DE-A 3 221 338, JP 1 313 585), aluminum and silicon-containing (DE-A 2 727 865) and alkaline earth, zinc, molybdenum, tungsten, niobium and phosphorus-containing (EP-A 0 441 101) bismuth vanadates are described. In addition, bismuth vanadates which do not contain any foreign elements are also known (DE-A 2 727 864; DE-A 3 315 850; DE-A 4 119 668).

This type of bismuth vanadate, known from the prior art, is colour-stable up to a temperature of 240° C. in polyolefin plastics. A crucial disadvantage is that the colour darkens above 240° C., this effect increasing with increasing temperature, and a transition to a dirty green colour occurs above 280° C. Therefore, these bismuth vanadate pigments cannot be used as colorants in an injection moulding process.

To improve the thermal stability, bismuth vanadate pigments have been coated with inorganic and organic materials. Thus, DE-A 3 926 870 describes the precipitation of barely soluble compounds of iron. EP-A 0 271 813 reports on molybdenum-containing bismuth vanadates which are coated with silicon dioxide, silanes and waxes. Furthermore, EP-A 0 074 049 mentions precipitation techniques using zirconium silicate, aluminium phosphate, antimony oxide and coatings of zirconium dioxide/silicon dioxide. According to U.S. Pat. No. 4,063,956, bismuth vanadate pigments may also be coated with one or more layers of silicon dioxide, aluminium oxide, titanium dioxide and boron oxide.

All the bismuth vanadate yellow pigments which are coated or treated in this way resist attack by molten polyolefin plastics up to a temperature of 280° C. In this region they have proved to be colour-stable. Above 280° C., however, the colour darkens again and becomes a dirty green at 300° C.

The object was, therefore, to provide bismuth vanadate yellow pigments which are colour-stable in molten polyolefin plastics above 280° C. and which produce, in moulded items made by injection moulding, a luminous, brilliant, pure yellow colour (yellow saturation $b^* \geq 85$, colour saturation $C^* \geq 85$, luminosity $L^* \geq 85$) The parameters $b^*$, $C^*$ and $L^*$ from the CIELAB colour system according to DIN 6174 (ISO 7724-3; Ullmanns Encyclopedia of Industrial Chemistry, Vol. A 20, pages 246, table 1, pages 258–259, 262–263) are used as a measure of colour quality.

This object can be achieved with the bismuth vanadate yellow pigments according to the invention.

The invention provides coated bismuth vanadate yellow pigments made from a core of a yellow-colouring bismuth vanadate of the composition $BiVO_4$ which are characterised in that the core has a surface activated with a phosphate-containing compound and an inorganic coating which contains at least one layer of aluminium phosphate or aluminium/zinc phosphate or silicon oxide, and optionally aluminium oxide and/or an organopolysiloxane as a further layer, and that more than 99 wt. % of the cores have a diameter from $\geq 0.2$ μm to $\leq 3.5$ μm.

The colour-stable bismuth vanadate yellow pigments according to the invention have proved to be colour-stable up to 300° C. in molten polyolefin plastics without the further layer of an organopolysiloxane and up to 320° C. with the external layer of organopolysiloxane. The colour of test specimens which have been produced in an injection moulding process from melts of polyethylene plastics at temperatures of 300° to 320° C., and thus were free-flowing, is a luminous, brilliant, pure yellow (yellow saturation $b^* \geq 85$, colour saturation $C^* \geq 85$, luminosity $L^* \geq 85$). There was virtually no difference in colour detected when these were compared with test specimens which had been made from less aggressive melts heated to only 200° C., which were therefore very viscous (dE<3, according to DIN 6174). In the temperature range 300° to 320° C., the melts of polyolefin plastics are so runny that even geometrically complicated parts can be manufactured without any problem in an injection moulding process. The highest processing requirements demanded of the colour-stability of bismuth vanadates are therefore satisfied by the bismuth vanadates according to the invention.

The activated surfaces of the yellow-colouring bismuth vanadate cores are preferably coated with the following coatings:

A) internal silicon oxide layer and external aluminium oxide layer

B) internal aluminium phosphate layer and external organopolysiloxane layer

C) internal aluminium/zinc phosphate layer and external organopolysiloxane layer D) internal silicon oxide layer and external organopolysiloxane layer E) internal silicon oxide layer, further aluminium oxide layer, external organopolysiloxane layer.

The organopolysiloxane used is preferably dimethylpolysiloxane.

Alkali metal phosphates, in particular trisodium phosphate, are preferably used as the phosphate-containing compounds.

The invention also provides a process for producing the bismuth vanadate yellow pigments according to the invention which is characterised in that suspensions in nitric acid of bismuthyl nitrate and vanadium(V) oxide or bismuth(III) oxide and vanadium(V) oxide are subjected to intensive shear strain, the bismuth vanadate produced, after a settling period, is filtered off and washed, the moist bismuth vanadate is dispersed in a hot, phosphate-containing, aqueous solution to activate the surface, then filtered off and washed, then at least one hydrated aluminium phosphate and/or aluminium/zinc phosphate and/or silicon oxide is precipitated onto the activated bismuth vanadate in suspension in one or more layers, optionally in combination with one or more oxides of divalent and/or trivalent and/or tetravalent and or pentavalent and/or hexavalent elements and/or one or more phosphates of divalent and/or trivalent and/or tetravalent elements, the bismuth vanadate pigment coated in this way is then filtered, washed and dried and optionally aftertreated with an organopolysiloxane.

Starting materials for preparing the bismuth vanadate cores according to the invention are preferably nitric acid suspensions of bismuthyl nitrate and vanadium(V) oxide or bismuth(III) oxide and vanadium(V) oxide, such as are described in DE-A 4 119 668. There, the starting products are made to react with the assistance of a wet milling process with the formation of bismuth vanadate yellow pigment. Bismuth vanadates are then obtained, however, with a wide distribution of particle sizes. The core diameters range from >0 to 10 $\mu$m with a high degree of scatter.

Differently from DE-A 4 119 668, bismuth vanadate cores with a narrower distribution (more than 99% of the cores with a diameter from $\geq 0.2$ $\mu$m to $\leq 3.5$ $\mu$m) are obtained, surprisingly, by the application of intensive shear strain (e.g. intensive stirring) to the suspension, preferably when the molar ratio of bismuth to vanadium is between 1.16 and 1.20, in particular 1.18 and the strength of the nitric acid medium in the suspension is preferably 36 to 40%, in particular 38%, and the solids fraction of the suspension is preferably between 40 and 47 wt. %, in particular between 41 and 43 wt. %. Deviations from these conditions lead to a more scattered distribution of core diameters. The strength of the nitric acid medium suspension may be for example formed by adding either bismuthyl nitrate and vanadium (V) oxide to 17 to 22 weight-% aqueous nitric acid or bismuth (III)oxide and vanadium(V)oxide to 32 to 37 weight-% aqueous nitric acid.

Conversion of the starting products into crystalline bismuth vanadate caused, for example, by intensive stirring, permits production of a brilliant yellow material with a creamy consistency from the initially low-viscosity, dirty brown-green coloured suspension. The temperature then normally rises to about 70° C. For complete formation of the pigment, it is advantageous to allow the material to stand for 16 hours. Finally, the mixture is diluted further with water and the pigment suspension is filtered. The washed pigment is used as the starting material for further treatment.

The surfaces of the particles are activated using a hot, phosphate-containing solution, in particular in a 0.1 molar trisodium phosphate solution at 90° C. The bismuth vanadate cores are dispersed for one hour, with stirring, wherein vanadate ions are partially leached out of the surface of the bismuth vanadate cores. The bismuth vanadate cores activated in this way are filtered off and adhering residues of vanadate are removed with water.

Hydrated aluminium phosphate or aluminium/zinc phosphate or silicon oxide is applied to the activated bismuth vanadate cores. Precipitation techniques such as those described, for example, in DE-A 4 037 878 or U.S. Pat. No. 3,370,971 are available for this procedure. The activated bismuth vanadate cores are dispersed in water. To precipitate the phosphates, aqueous solutions of aluminium sulphate, or aluminium and zinc sulphate are preferably used and then aqueous phosphoric acid is added. The suspensions are then adjusted to a neutral to weakly acid state using dilute caustic soda. An aqueous alkaline sodium silicate solution may also be added to the bismuth vanadate cores dispersed in water. The pH is then lowered with aqueous sulphuric acid and hydrated silicon oxide is precipitated in neutral to weakly alkaline medium. The bismuth vanadate pigments coated in this way are filtered, washed and dried in the conventional way.

It has proved to be especially favourable if the amount of precipitated material, after drying, is 3 to 10 wt. %, preferably 8 to 10 wt. % with respect to the untreated bismuth vanadate. Amounts larger than 10 wt. % impair the optical properties of the bismuth vanadate pigments.

The amount of material being precipitated is preferably applied to the bismuth vanadate cores not as a thick layer in one operation, but sequentially in several thin layers. In this case, the precipitation reagents are added in portions and the pH is adjusted to a value which is appropriate for the particular precipitate after each addition. Layers of aluminium phosphate and/or aluminium/zinc phosphate may also be combined with layers of silicon oxide in any sequence in this way.

To increase the colour-stability from 300° C. to 320° C., a layer of organopolysiloxane may preferably also be applied to the coating. Dimethylpolysiloxane in an amount of 2 to 12 wt. %, preferably 5 to 10 wt. % is particularly preferred. Treatment preferably takes place in a ball mill for 5 minutes.

Bismuth vanadate yellow pigments according to the invention are characterised in that they are colour-stable in molten polyolefin plastics, even in the high temperature region above 280° C. up to 320° C., and that the colour of moulded items prepared by injection moulding is a luminous, brilliant, pure yellow (yellow saturation b*$\geq$85, colour saturation C*$\geq$85, luminosity L*$\geq$85).

To produce further pigment properties which play a part in other fields of application, for example in lacquers, other materials may be applied to the activated bismuth vanadate cores coated with aluminium phosphate and/or aluminium/zinc phosphate and/or silicon oxide, without losing the colour quality at high temperature in polyolefin plastics. This type of material may be oxides of di, tri, tetra, penta and hexavalent elements, and phosphates of di, tri and tetravalent elements (e.g.: MgO, ZnO, $ZnSiO_3$, $Al_2O_3$, $Ce_2O_3$, $CeO_3$, $ZrO_2$, $MoO_3$, $Mg_3(PO_4)_2$, $Ca_3(PO_4)_2$, $Zn_3(PO_4)_2$). Thus, for example, hydrated aluminium oxide may be applied, which improves the gloss of lacquers.

The colour-stability is also retained if the activated bismuth vanadate cores are first coated with the oxides or phosphates mentioned above and then one or more layers of aluminium phosphate and/or aluminium/zinc phosphate and/or silicon oxide are applied. Examples which may be mentioned are calcium phosphate and molybdenum oxide, which lead to increased photo-stability of lacquers.

The following factors are important with respect to the colour-quality of bismuth vanadate yellow pigments according to the invention:

a) a narrow size distribution for the bismuth vanadate cores (more than 99 wt. % of cores with a diameter from $\geq 0.2$ $\mu$m to $\leq 3.5$ $\mu$m).

b) a core surface activated with a phosphate-containing compound and c) a coating which contains at least one layer of aluminium phosphate or aluminium/zinc phosphate or silicon oxide.

Furthermore, an organopolysiloxane may also be present as an external layer. Bismuth vanadate yellow pigments which satisfy all three criteria a) to c), are characterised in that each of the colour parameters b*, C* and L* have a value $\geq 85$ in polyolefin plastics and lacquers and that the colour difference dE* between sample items made from polyolefin plastics at between 200° C. and 300° C. or 320° C. is less than 3.

In the presence of a commercially available titanium dioxide white pigment, for example, bismuth vanadate yellow pigments whose cores have a broader size distribution than those according to the invention, are less intensely coloured. Thus, the colour parameters b* and C* drop to well under 40 when mixed with five times the amount by weight of white pigment. When using bismuth vanadate yellow pigments according to the invention with a narrower size distribution, in contrast, the colour parameters remain at values >40.

The invention is intended to be explained in more detail by means of the following examples.

EXAMPLES

A) Production of intermediates according to the invention (bismuth vanadate cores) with a narrow size distribution:

In a 1 l beaker, 291.5 g of bismuthyl nitrate and 77.5 g of vanadium pentoxide (Brunnauer, Emmett and Teller or "BET" surface area 4.5 m²/g) are subjected to shear strain using a high-speed agitator (mixing turbine of the D 032s type from the Kotthoff Co., speed 1,000 rpm) in the presence of 60 ml of 65% strength nitric acid and 200 ml of water until a brilliant yellow material with a creamy consistency has formed. This was the case after a stirring time of about 1 hour. The reaction product was left to stand for 16 hours. Then the mixture was diluted with 350 ml of water and stirred for one hour. The pigment suspension was filtered under suction on a blue-band filter in a suction filter and the filter cake was washed three times with 200 ml of water and dried at 120° C.

Chemical analysis of the crystalline material gave the composition $BiVO_4$.

To determine the size distribution, the bismuth vanadate cores were dispersed in a 0.1% strength sodium hexametaphosphate solution in an ultrasonic bath and measured in a laser diffraction spectrometer (Mastersizer from the Malvern Co.). More than 99 wt. % of the cores had a diameter from $\geq 0.2$ μm to $\leq 3.5$ μm.

B) Activation of the bismuth vanadate cores:

100 g of the bismuth vanadate cores produced in A) were dispersed in 1000 ml of a 0.1 molar sodium orthophosphate solution and stirred for one hour at 90° C. After cooling to 50° to 60° C., the product was filtered under suction on a black band filter in a suction filter and washed five times with 300 ml of water. The conductivity of the last portion of wash water used was less than 100 μS.

Example 1

Applying a layer of aluminium phosphate:

The moist filter cake from B) was dispersed in 1000 ml of water, the suspension was heated to 85° C. and stirred for 15 minutes (pH=8.0), a solution of 27.3 g of $Al_2(SO_4)_3.18H_2O$ in 100 ml of water was added to the suspension over the course of 15 minutes (pH=3.3), then a mixture of 9.5 g of 85% strength phosphoric acid and 100 ml of water was added, also over the course of 15 minutes (pH=2.3), the pH of the suspension was adjusted to 6.5 with 5% strength caustic soda solution and the suspension was stirred for a further 30 minutes. The coated bismuth vanadate cores were then separated under suction, washed five times with 300 ml of water and dried at 120° C.

Example 2

Applying a layer of aluminium/zinc phosphate:

The moist filter cake from B) was dispersed in 1000 ml of water, the suspension was heated to 85° C. and stirred for 15 minutes (pH=8.0), a solution of 11.2 g of $ZnSO_4.7H_2O$ and 13.6 g of $Al_2(SO_4)_3.18H_2O$ in 100 ml of water was added suspension over the course of 15 minutes (pH=2.9), then a mixture of 7.8 g of 85% strength phosphoric acid and 100 ml of water was added, also over the course of 15 minutes (pH=2.2), the pH of the suspension was adjusted to 6.5 with 5% strength caustic soda solution, the suspension was stirred for a further 30 minutes and the coated bismuth vanadate cores were separated, washed and dried in the same way as in example 1.

Example 3

Applying a layer of silicon oxide:

The moist filter cake from B) was dispersed in 700 ml of water, the suspension was heated to 90° C. with stirring (pH=8.0), the pH of the suspension was raised to 10 with 5% strength caustic soda solution, 27.8 ml of waterglass solution (6 moles of $SiO_2$/l and 3.6 moles of NaOH/l) were added, the suspension was stirred at 90° C. for 30 minutes (pH=10.2), a mixture of 5.1 g of 96% strength sulphuric acid and 300 ml of water were added dropwise over the course of one hour (pH=8.0), the pH of the suspension was lowered to 7 with 1% strength sulphuric acid, the suspension was stirred for a further 30 minutes and the coated bismuth vanadate cores were separated, washed and dried in the same way as in example 1.

Examples 4a to 4c

Application of an external layer of dimethylpolysiloxane to the coated cores in accordance with examples 1, 2 and 3:

100 g of the coated bismuth vanadate cores in accordance with examples 1, 2 and 3 were agitated in a Bloch-Rossetti mill for 5 minutes in the presence of 10 g of dimethylpolysiloxane with a viscosity of 100 mPa.s.

To determine the colour data, the bismuth vanadate yellow pigments from examples 1 to 4c were each separately melted with a polyolefin (Vestolen® A 6016 from Hüls AG). The pigment volume concentration (pvc) was 1% in each case. Samples in the form of sheets were prepared at 200° C. using an injection moulding machine. Colour measurements on the samples were performed according to DIN 53236, method A (ISO 7724-2, Ullmanns Encyclopedia of Industrial Chemistry, Vol. A 20, page 246, table 1, pages 258–259, 262–263), with the assistance of spectral colour measuring equipment. The CIELAB colour system according to DIN 6174 was used to evaluate the results. The measures of colour quality were yellow saturation b*, colour density C* and luminosity L*. All the samples were a brilliant yellow colour. The colour parameters b*, C* and L* had values of $\geq 85$.

To assess the colour-stability, a set of samples was prepared in the same way from each of the bismuth vanadate yellow pigments from examples 1 to 4c, at temperatures between 200° C. and the highest temperature used in this process, 320° C., at intervals of 20° C. Within each set, the colour difference dE* according to DIN 6174, as compared with the corresponding sample produced at 200° C., was determined. Samples with a colour difference dE* of less than 3 were classified as colour-stable. According to this test method, examples 4a to 4c proved to be colour-stable up to the maximum temperature of 320° C. Examples 1 to 3 were colour-stable up to a temperature of 300° C.

For comparison, bismuth vanadate yellow pigments which were not in accordance with the invention were prepared. Thus, each of examples 1 to 4c were modified in such a way that activation of the bismuth vanadate cores with trisodium phosphate was omitted. All the other steps remained the same. These pigments not in accordance with the invention were then subjected to the same heat-stability test as described above. In no case was the colour-stability of these pigments any higher than 280° C.

Examples 5 to 10

In further examples 5 to 10, also not in accordance with the invention, bismuth vanadates with a broad size distribution were prepared. This method of preparation differed from the method of preparation according to the invention in only one variable each time.

The differences as compared with preparation under A) comprised; in example 5, that the suspension was subjected to a reduced shear strain by reducing the speed of the agitator; in example 6, that the stirring time required to form bismuth vanadate was increased to 2 hours; in example 7, that the solids fraction was reduced to 35 wt. % and in example 8, that it was increased to 50 wt. %; in example 9, that the amount of nitric acid was decreased to 50 ml and in example 10 that it was increased to 70 ml.

Particle size analysis of the bismuth vanadate cores from examples 5 to 10 was performed in the same way as with the cores according to the invention from A). Examples 5 to 10 produced, as compared with cores from A), a broader size distribution. The proportion of cores with diameters from $\geq 0.2$ μm to $\leq 0.35$ μm was reduced from 99% to less than 90%.

The bismuth vanadate cores from examples 5 to 10 were subjected to phosphate activation in the same way as in B) and to inorganic treatment in the same way as in examples 1 to 3. Production of yellow coloured samples from polyolefin plastics in the temperature range 200° to 300° C. and colour measurements and evaluations were performed in the same way as described for examples 1 to 3. With each of the pigments from examples 5 to 10, at least one of the colour parameters b*, C* and L* was less than 85. Visual assessment agreed with this: the samples from examples 5 to 10 had a less brilliant shade of colour than those from examples 1 to 3 with b*, C* and L* $\geq 85$.

Furthermore the colouring power of the bismuth vanadate yellow pigments from examples 1 to 3 and 5 to 10 were assessed in the presence of a white pigment in a coat of paint. For this, the yellow bismuth vanadate pigments were mixed with a white pigment (titanium dioxide pigment R-KB-2, product of Bayer AG) in the ratio by weight of 1:5 and incorporated into an air-drying lacquer (Alkydal® F 48, product of Bayer AG) with the assistance of a dish rubbing-in machine. The pigment concentration was 15%. The pigmented lacquer was applied in a covering layer onto white cardboard.

The dried coats of paint with bismuth vanadate pigments from examples 1 to 3 with a narrower size distribution were more intensely yellow coloured than those with bismuth vanadate pigments from examples 5 to 10 with a broader size distribution. Colour determination was performed according to DIN 53236, method A, combined with DIN 6174. The measures of colour intensity used were yellow saturation b* and colour C*. The values for b* and C* in the case of samples according to the invention were above 40 and in the case of samples not according to the invention were less than 40.

What is claimed is:

1. A process for producing coated bismuth vanadate yellow pigments comprising:
    a) core particles of a yellow-coloring bismuth vanadate, said core particles having an external surface which is activated with a phosphate-containing compound; and
    b) a coating which is located on top of the activated external surface of the core particles, said coating comprising at least one layer of at least one material selected from the group consisting of aluminum phosphate, aluminum/zinc phosphate or silicon oxide;
    wherein at least 99 wt. % of the core particles have a diameter that is from 0.2 μm to 3.5 μm; comprising the following steps:

(a) subjecting a reaction mixture comprising a suspension in nitric acid of bismuthyl nitrate and vanadium (V) oxide, or a suspension in nitric acid of bismuth (III) oxide and vanadium (V) oxide, to stirring to form bismuth vanadate particles;
    (b) terminating the stirring and holding the reaction mixture for a period of time;
    (c) filtering off the bismuth vanadate particles;
    (d) washing the bismuth vanadate particles;
    (e) dispersing the washed bismuth vanadate particles in a hot, phosphate-containing, aqueous solution to activate the surface of the particles;
    (f) filtering off the activated bismuth vanadate particles;
    (g) washing the activated bismuth vanadate particles;
    (h) dispersing the activated bismuth vanadate particles in water to form a suspension;
    (i) precipitating at least one material selected from the group consisting of hydrated aluminum phosphate, aluminum/zinc phosphate or silicon oxide onto the external surface of the activated bismuth vanadate particles in the suspension to form said coating;
    (j) filtering off the coated bismuth vanadate particles; and
    (k) washing and drying the coated bismuth vanadate particles, wherein said hot, phosphate-containing, aqueous solution is at a temperature of about 85°–90° C.

2. A process according to claim 1, wherein the suspension in step (a) is formed by adding either (1) bismuthyl nitrate and vanadium (V) oxide to 17 to 22 wt. % strength aqueous nitric acid, or (2) bismuth (II) oxide and vanadium (V) oxide to 32 to 37 wt. % strength aqueous nitric acid; the molar ratio of bismuth to vanadium being between 1.16 and 1.20, so that the solids fraction is between 40 to 47 wt. %.

3. A process according to claim 2, wherein the suspension in step (a) is formed by adding either (1) bismuthyl nitrate and vanadium (V) oxide to 19 to 20 wt. % strength aqueous nitric acid, or (2) bismuth (III) oxide and vanadium (V) oxide to 34 to 35 wt. % strength aqueous nitric acid; the molar ratio of bismuth to vanadium being about 1.18, so that the solids fraction is between 41 to 43 wt. %.

4. A process according to claim 1, wherein after activation of the surface of the surface of the particles in step (e), aluminum/zinc phosphate is precipitated onto the bismuth vanadate particles in step (i) by adding aluminum sulphate, zinc sulphate and aqueous phosphoric acid to the bismuth vanadate suspension and then increasing the pH of the suspension with caustic soda solution.

5. A process according to claim 1, wherein after activation of the surface of the particles in step (e), silicon oxide is precipitated onto the bismuth vanadate particles in step (i) by adding sodium silicate to the bismuth vanadate suspension and then lowering the pH of the suspension by adding aqueous sulphuric acid, and optionally, then aluminum oxide is precipitated in neutral to weakly acid medium by adding an aqueous aluminum sulphate solution and raising the pH with caustic soda solution.

6. A process according to claim 1, wherein after activation of the surface of the particles in step (e), aluminum phosphate is precipitated onto the bismuth vanadate particles by adding aluminum sulphate to the bismuth vanadate suspension and then first lowering the pH of the suspension by adding aqueous phosphoric acid and then raising the pH of the suspension by adding caustic soda solution.

7. A process according to claim 1, wherein in addition to the at least one material that is precipitated onto the external surface of the activated bismuth vanadate particles in step (i), at least one additional material selected from the group consisting of oxides of divalent elements, oxides of trivalent elements, oxides of tetravalent elements, oxides of pentavalent elements, oxides of hexavalent elements, phosphates of divalent elements, phosphates of trivalent elements and phosphates of tetravalent elements, is precipitated onto the external surface of the activated bismuth vanadate particles.

8. A process according to claim 1, wherein after the coated bismuth vanadate particles are washed and dried in step (k), the particles are treated with at least one material selected from the group consisting of aluminum oxide and an organopolysiloxane so as to form at least one layer of the at least one material selected from the group consisting of aluminum oxide and an organopolysiloxane.

9. The process of claim 1, wherein said phosphate-containing, aqueous solution is a solution of trisodium phosphate.

10. The process of claim 1, wherein said phosphate-containing, aqueous solution is a 0.1 molar solution of trisodium phosphate.

* * * * *

UNITED STATES PATENT AND TRADEMARK OFFICE
CERTIFICATE OF CORRECTION

PATENT NO. : 5,851,587
DATED : December 22, 1998
INVENTOR(S) : Schittenhelm et al.

It is certified that error appears in the above-identified patent and that said Letters Patent is hereby corrected as shown below:

Column 8, line 32 (Claim 2), "bismuth (II) oxide" should read -- bismuth (III) oxide--.

Column 8, line 43 (claim 4), "after activation" should be -- after the activation--. In column 8, line 44 (claim 4), "of the surface of the surface of the particles in step (e)," should read -- of the surface of the particles in step (e),--.

Signed and Sealed this

Thirty-first Day of October, 2000

Attest:

Q. TODD DICKINSON

*Attesting Officer*                *Director of Patents and Trademarks*